(12) United States Patent
Peng

(10) Patent No.: US 9,557,779 B2
(45) Date of Patent: Jan. 31, 2017

(54) INPUT STRUCTURE AND PORTABLE ELECTRONIC DEVICE USING THE SAME

(71) Applicant: FIH (HONG KONG) LIMITED, Kowloon (HK)

(72) Inventor: Yung-Sung Peng, New Taipei (TW)

(73) Assignee: FIH (HONG KONG) LIMITED, Kowloon (HK)

( * ) Notice: Subject to any disclaimer, the term of this patent is extended or adjusted under 35 U.S.C. 154(b) by 0 days.

(21) Appl. No.: 14/678,509

(22) Filed: Apr. 3, 2015

(65) Prior Publication Data
US 2016/0239054 A1   Aug. 18, 2016

(30) Foreign Application Priority Data

Feb. 12, 2015   (TW) .............................. 104104858 A

(51) Int. Cl.
| H05K 7/00 | (2006.01) |
| H05K 5/00 | (2006.01) |
| G06F 1/16 | (2006.01) |

(52) U.S. Cl.
CPC ............ *G06F 1/1684* (2013.01); *G06F 1/1656* (2013.01)

(58) Field of Classification Search
CPC ..................................................... G05F 1/1632
USPC ....................................................... 361/679.31
See application file for complete search history.

(56) References Cited

U.S. PATENT DOCUMENTS

2002/0050934 A1*   5/2002   Olodort ................. G06F 3/0221
                                                              341/22

* cited by examiner

*Primary Examiner* — Jerry Wu
(74) *Attorney, Agent, or Firm* — Zhigang Ma

(57) ABSTRACT

An input structure applied in a portable electronic device includes a main body and an electric assembly. The main body is detachably fitted to the portable electronic device. The electric assembly includes a sensing module and a communication module. The sensing module triggers electric signals in respond to manipulation of users. The communication module communicates with the sensing module and the portable electronic device to send the electric signals to the portable electronic device.

15 Claims, 5 Drawing Sheets

INPUT STRUCTURE AND PORTABLE ELECTRONIC DEVICE USING THE SAME

FIELD

The subject matter herein generally relates to input structures, and particularly to an input structure using sensors to sense external manipulation, so as to make a portable electronic device perform a preset function.

BACKGROUND

A conventional key structure of a portable electronic device substantially comprises a spring-type structure and a film-type structure. In the spring-type structure, a pin is disposed on one side of a key body with respect to an electrical switch of the portable electronic device, and a spring is disposed between the key body and the electrical switch. The film-type structure is made of rubber, and the film-type structure is disposed in a pre-designed key area of the electronic device. No matter the spring-type structure using the spring for elastic recovery or the film-type structure made of rubber, after being used for a long time, the elastic fatigue of the material occurs, thereby influencing the sensitivity of the key structure.

BRIEF DESCRIPTION OF THE DRAWINGS

Implementations of the present technology will now be described, by way of example only, with reference to the attached figure.

DETAILED DESCRIPTION

Figure 1:
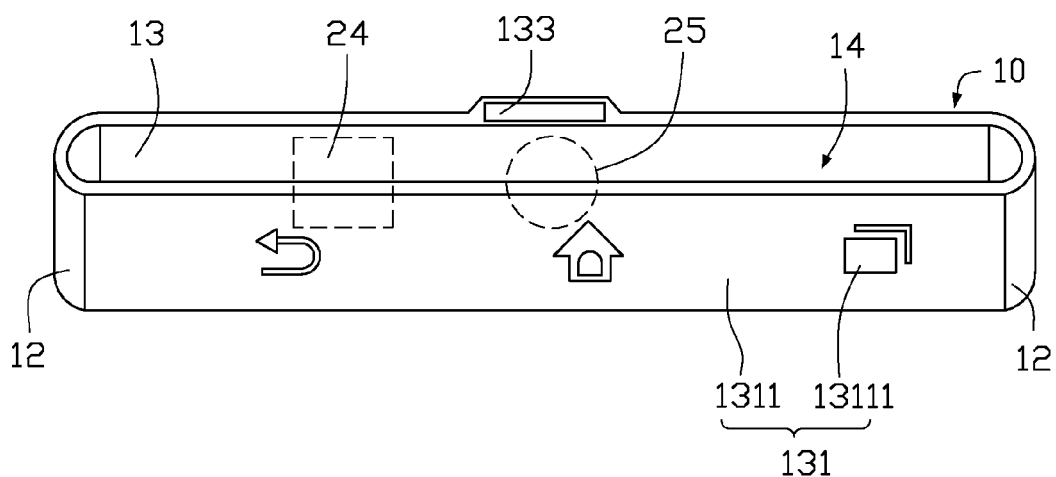
FIG. 1 is an isometric view of an input structure, according to an exemplary embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure is described in relation to a input structure and a portable electronic device using the same.

Figure 2:
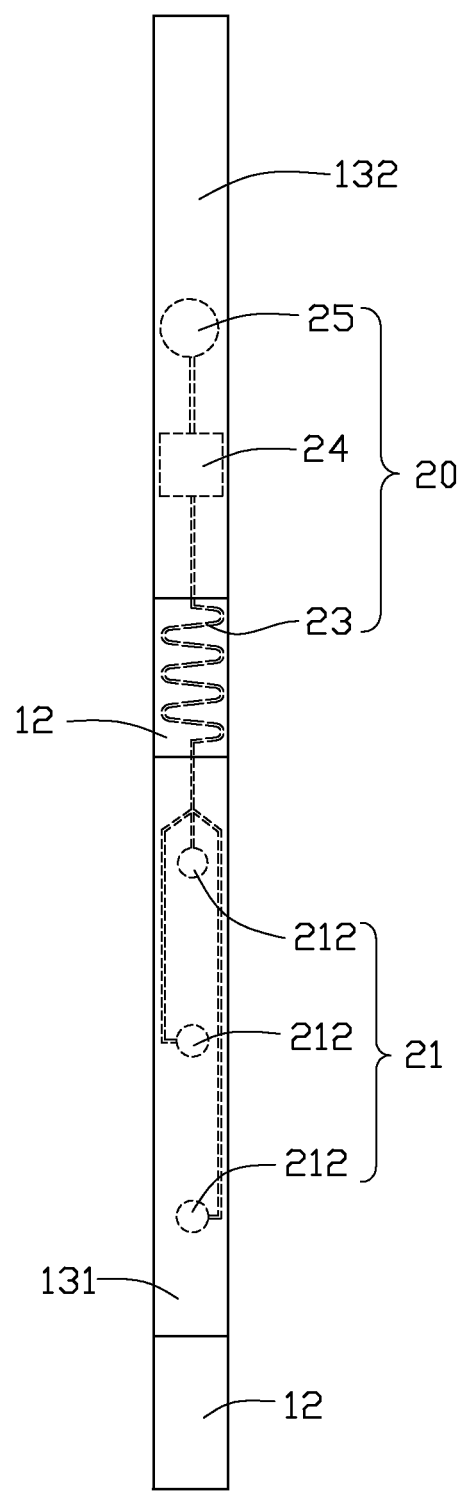
FIG. 2 is a diagrammatic view of the input structure of FIG. 1, wherein the input structure is in an expansion state.

FIG. 1 and FIG. 2 illustrate an input structure 100 applied in a portable electronic device 200 (see FIG. 4), according an exemplary embodiment. The portable electronic device 200 can be a mobile phone, a tablet, or an intelligent watch, for example.

The input structure 100 includes a main body 10 and an electric assembly 20. The main body 10 is a hollow structure for accommodating the electric assembly 20. In at least one embodiment, the electric assembly 20 includes a sensing module 21, a plurality of conductive wires 23, a communication module 24, and a power supply 25.

Figure 3:
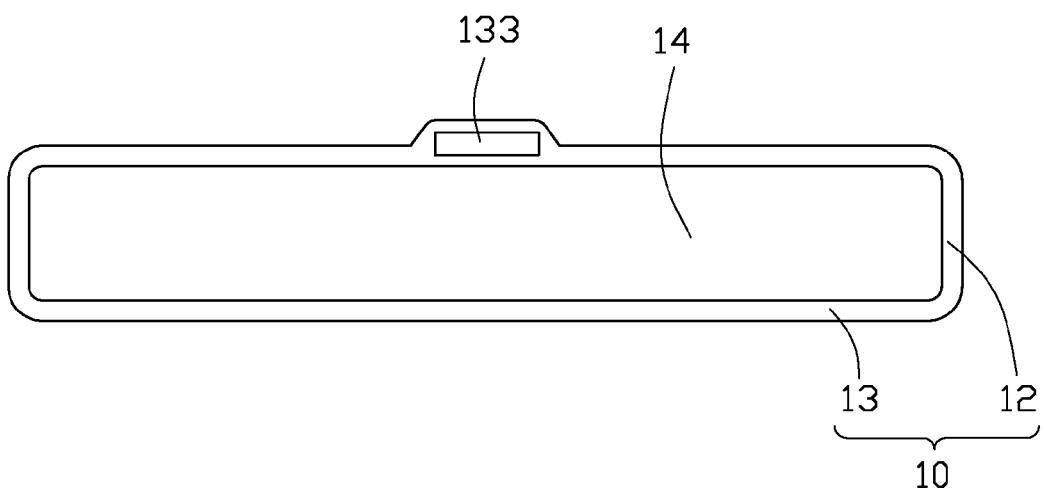
FIG. 3 is a side-on view of the input structure of FIG. 1.

FIG. 3 illustrates that the main body 10 is substantially annular-shaped and includes two opposite flexible portions 12 and two opposite accommodation portions 13. In at least one embodiment, all of the two flexible portions 12 and the two accommodation portions 13 are hollow structures. The two flexible portions 12 and the two accommodation portions 13 are alternately connected end to end. Thus, a cavity 14 is defined by the main body 10 to allow the portable electronic device 200 to pass, and then the main body 10 can be firmly fitted around the portable electronic device 200. Each flexible portion 12 is connected between the two accommodation portions 13 and is made of elastic materials, such as rubbers, for example. Thus, an inner diameter of the cavity 14 can be adjusted by drawing the flexible portion 12 to suit other portable electronic devices with different sizes. The two accommodation portions 13 are configured to accommodate the sensing module 21, the plurality of conductive wires 23, the communication module 24, and the power supply 25.

In at least one embodiment, the two accommodation portions 13 include a first accommodation portion 131 and a second accommodation portion 132. The first accommodation portion 131 forms an operating surface 1311, and a plurality of icons 13111 are printed on operating surface 1311 to indicate auxiliary functions of the portable electronic device 200. The auxiliary functions may at least include "return", "directory", and "home". In addition, the sensing module 21 is received in the first accommodation portion 131 and is associated with the plurality of icons 13111, details will be illustrated below.

The second accommodation portion 132 defines a groove (not shown) to receive the power supply 25. In addition, a tab 133 is protruded from the second accommodation portion 132. The tab 133 is located adjacent to the groove to detachably cover the groove.

Figure 5:
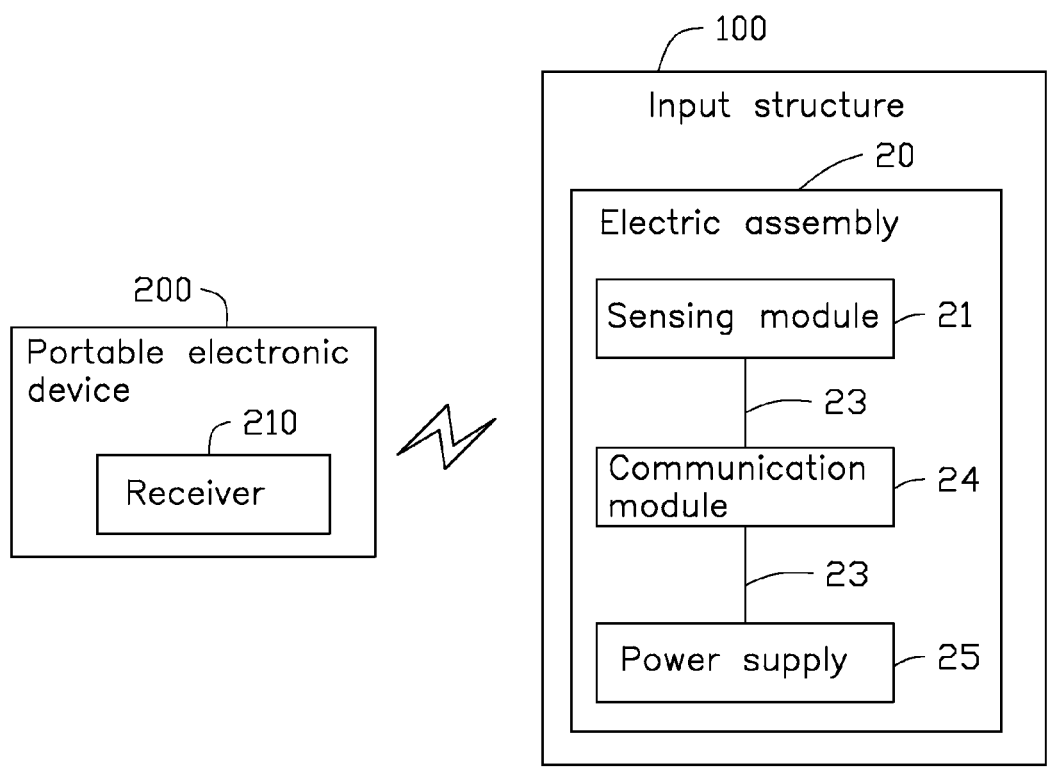
FIG. 5 is a block diagram of the input structure of FIG. 1.

Also referring to FIG. 5, the sensing module 21 is configured to trigger electric signals. In at least one embodiment, the sensing module 21 includes a plurality of sensors 212 corresponding to the plurality of icons 13111, respectively. The plurality of sensors 212 are electronically connected to the communication module 24 via the plurality of conductive wires 23. When one of the plurality of icons 13111 is manipulated (such as being touched or pressed by users), the corresponding sensor 212 triggers the electric signals to the communication module 24.

The plurality of conductive wires 23 are configured to electronically connected to the sensing module 21, the communication module 24, and the power supply 25. A part of the plurality of conductive wires 23 are arranged in the flexible portions 12 in a spiral, meander, or other geometrical configuration, to protect the part of the plurality of conductive wires 23 from being broken when the flexible portions 12 are deformed.

The communication module 24 communicates with a receiver 210 of the portable electronic device 200 to send the electric signals from the sensing module 21 to the receiver 210. In at least one embodiment, the communication module 24 is received in the second accommodation portion 132. Optionally, the communication module 24 can be a BLUTOOTH® module.

The power supply 25 is configured to provide power to the sensing module 21 and the communication module 24. In at least one embodiment, the power supply 25 can be a rechargeable lithium-ion battery and is received in the second accommodation portion 132.

Figure 4:
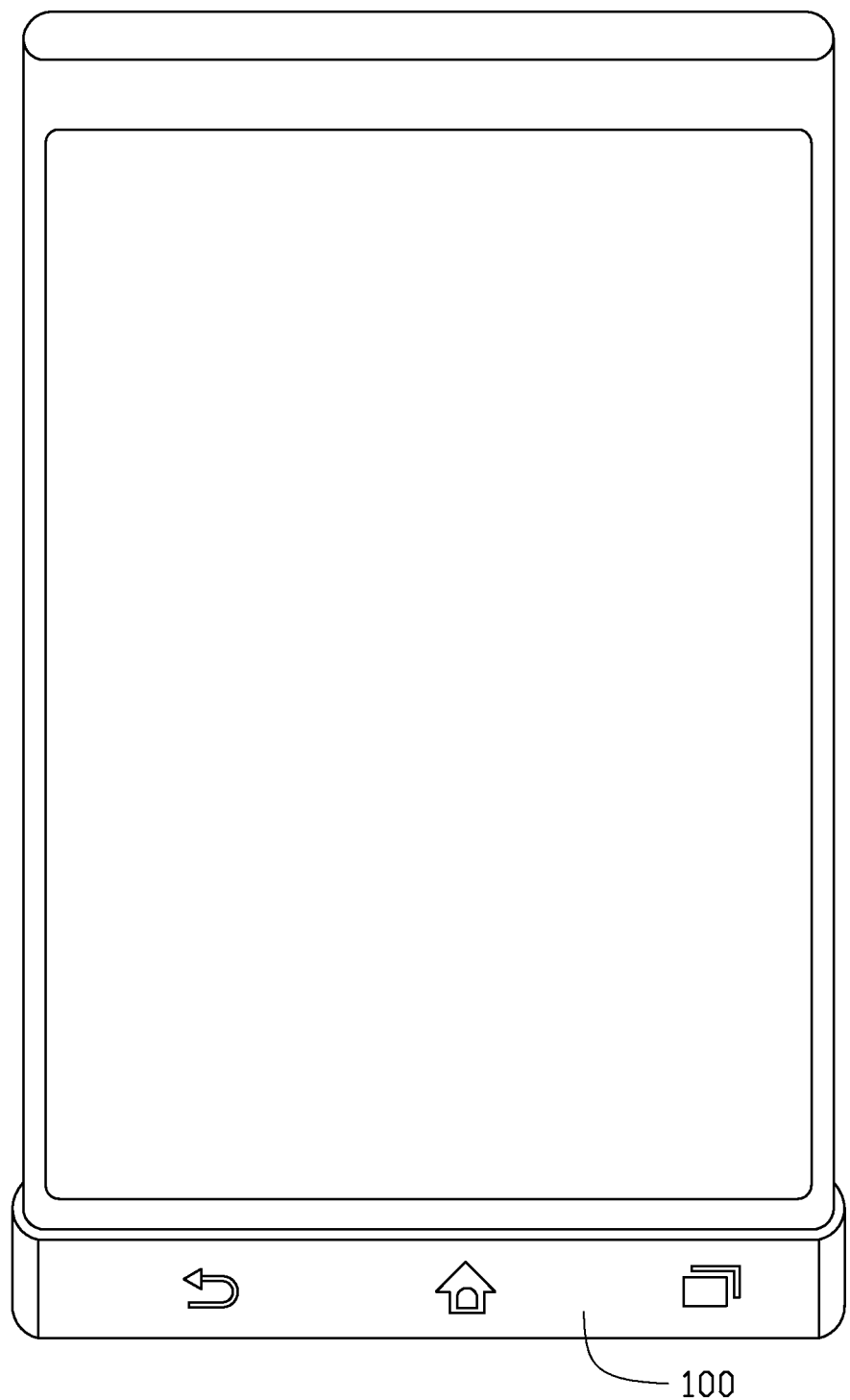
FIG. 4 is an assembled, diagrammatic view of the input structure of FIG. 1 applied in a portable electronic device.

Also referring to FIG. 4, In use, the power supply 25 is arranged in the groove to power the input structure 100, and then the input structure 100 is fitted around the portable electronic device 200. When the sensing module 21 is activated, the sensor 212 triggers the electric signals to the communication module 24 in respond to the manipulation of the corresponding icon 13111. The communication module 24 sends the electric signals to the receiver 210 of the portable electronic device 200, so as to perform the auxiliary functions of the portable electronic device 200.

In other embodiments, when the portable electronic device 200 is not in use, the communication module 24 will enter a sleep mode to conserve power. At this time, no wireless communication is established between the input structure 100 and the receiver 210.

In other embodiments, both the communication module 24 the power supply 25 can be received in any other positions of the main body 10.

In other embodiments, the input structure 100 can communicate with the portable electronic device 200 by other wireless communicate manners, such as wireless fidelity (WIFI), general packet radio service (GPRS), or near field communication (NFC).

In other embodiments, the main body 10 only includes one accommodation portion 13 to receive the electric assembly 20, and the accommodation portion 13 can be attached, adhered, or latched on the portable electronic device 200.

In other embodiments, one of the two accommodation portions 13 can be omitted. At this time, the main body 10 is substantially a semi-annular shape.

In summary, the electric assembly 20 is received in the main body 10 and communicates with the portable electronic device 200 to control the portable electronic device 200, which allows further size reductions of the portable electronic device 200 employing the input structure 100. Thus, the number of components required by the portable electronic device 200 are significantly reduced, and the portable electronic device 200 can achieve requirements of being light, thin, short, and small, and thereby reducing the manufacturing cost.

The embodiments shown and described above are only examples. Many details are often found in the art such as the other features of the input structure and the portable electronic device using the same. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. An input structure applied in a portable electronic device, the input structure comprising:
   a main body detachably fitted to the portable electronic device, wherein the main body is substantially annular-shaped and comprises at least one flexible portion and two opposite accommodation portions connected to at least one flexible portion to define a cavity, the at least one flexible portion allow the portable electronic device to be received in the cavity with the at least one flexible portion and the accommodation portions tightly sleeved around the portable electronic device; and a diameter of the cavity can be adjusted to suit other portable electronic devices by drawing the flexible portion; and
   an electric assembly comprising:
   a sensing module configured to trigger electric signals to a communication module through the flexible portion; and
   the communication module configured to send the electric signals to the portable electronic device.

2. The input structure as claimed in claim 1, wherein the two accommodation portions comprise a first accommodation portion, the first accommodation portion forms an operating surface, and a plurality of icons are printed on operating surface to indicate auxiliary functions of the portable electronic device.

3. The input structure as claimed in claim 2, wherein the sensing module is received in the first accommodation portion and is associated with the plurality of icons.

4. The input structure as claimed in claim 3, wherein the sensing module comprises a plurality of sensors corresponding to the plurality of icons, respectively, the plurality of sensors are electronically connected to the communication module to trigger the electric signals to the communication module.

5. The input structure as claimed in claim 1, wherein the two accommodation portions comprise a second accommodation portion, the electric assembly further comprises a power supply, both the communication module and the power supply are received in the second accommodation portion.

6. The input structure as claimed in claim 1, wherein the electric assembly further comprises a plurality of conductive wires to electronically connected to the sensing module and the communication module, and a part of the plurality of conductive wires are arranged in the flexible portions in a spiral, meander, or other geometrical configuration.

7. The input structure as claimed in claim 6, wherein each flexible portion is made of elastic materials.

8. A portable electronic device comprising an input structure, the input structure comprising:
   a main body defining defines a cavity for detachably fitting to the portable electronic device;
   the main body is substantially annular-shaped and comprises at least one flexible portion and two opposite accommodation portions connected to the at least one flexible portion to define the cavity, the at least one flexible portion allow the portable electronic device to be received in the cavity with the at least one flexible portion and the accommodation portions tightly sleeved around the portable electronic device; and a diameter of the cavity can be adjusted to suit other portable electronic devices by drawing the flexible portion; and an electric assembly comprising:

a sensing module configured to trigger electric signals in respond to manipulation of users and send to a communication module through the flexible portion; and the communication module configured to send the electric signals from the sensing module to the portable electronic device.

9. The portable electronic device as claimed in claim 8, wherein the two accommodation portions comprise comprises a first accommodation portion, the first accommodation portion forms an operating surface, and a plurality of icons are printed on operating surface to indicate auxiliary functions of the portable electronic device.

10. The portable electronic device as claimed in claim 9, wherein the sensing module is received in the first accommodation portion and is associated with the plurality of icons.

11. The portable electronic device as claimed in claim 10, wherein the sensing module comprises a plurality of sensors corresponding to the plurality of icons, respectively, the plurality of sensors are electronically connected to the communication module to trigger the electric signals to the communication module.

12. The portable electronic device as claimed in claim 9, wherein the electric assembly further comprises a plurality of conductive wires to electronically connected to the sensing module and the communication module, and a part of the plurality of conductive wires are arranged in the at least one flexible portion in a spiral, meander, or other geometrical configuration.

13. The portable electronic device as claimed in claim 12, wherein the at least one flexible portion is made of elastic materials.

14. The portable electronic device as claimed in claim 8, wherein the main body comprises a second accommodation portion, the electric assembly further comprises a power supply, both the communication module and the power supply are received in the second accommodation portion.

15. The portable electronic device as claimed in claim 8, further comprising a receiver communicating with the communication module.

\* \* \* \* \*